UNITED STATES PATENT OFFICE 2,057,681

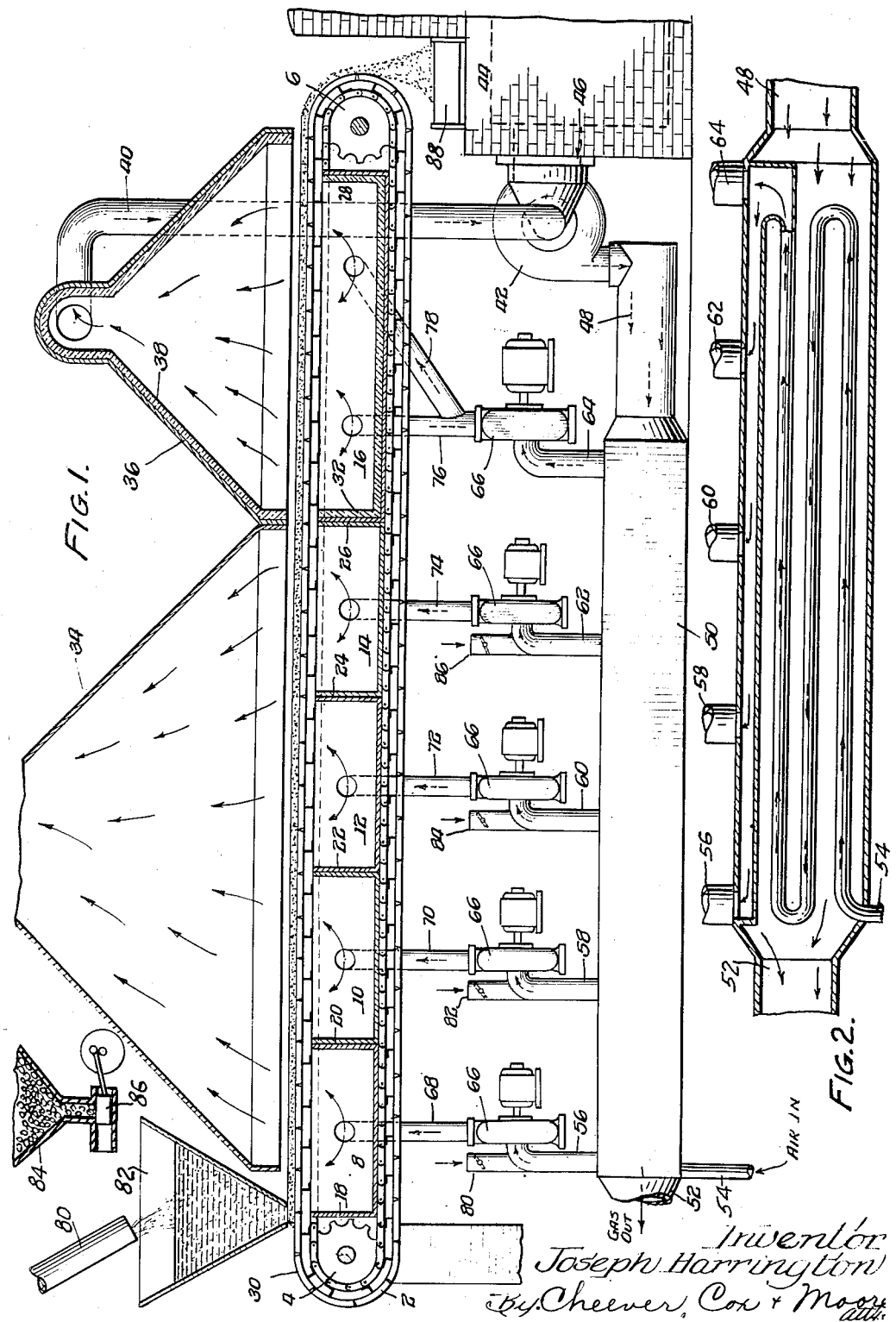

METHOD OF DRYING AND DESTROYING MUNICIPAL WASTES

Joseph Harrington, Riverside, Ill.

Application December 21, 1931, Serial No. 582,312

6 Claims. (Cl. 110—15)

This invention relates to the treatment and disposal of municipal wastes including garbage, sewage sludge and the like.

In certain of my prior applications hereinafter referred to I have disclosed and broadly claimed methods and apparatus for the treatment and/or destruction of municipal wastes including liquid sewage by the application of heat, and particularly hot gas, thereto.

The objects and distinguishing features of the invention of my present application differ from the inventive objects and features of the aforesaid prior applications in that in the present invention the reduction of the waste, including liquid sewage to combustibility and/or its destruction by ignition, is carried on, in one aspect of the invention, as a continuous process; and in another aspect of the invention is accomplished by the projection of heated gas through the waste in such a manner that the moisture content thereof is progressively reduced to a point where it is rendered combustibly dry so that the continued projection of heated gas therethrough causes the waste automatically to ignite and be consumed; in other aspects and objects, my present invention differs from the disclosures of my prior applications in that in the present invention the process resides in controlling the temperature of the gases which reduce the municipal waste to combustible dryness so that the temperature of the gas projected through the waste is progressively reduced more or less to correspond with the reduction in the moisture content of the waste and in a manner to prevent ignition or charring of the waste, and this aspect of my invention also includes subjecting the thus combustibly dried waste to the action of gas at temperatures sufficiently high to produce ignition whereby to cause the thus dried waste automatically to ignite and be consumed. My invention is preferably, but not necessarily carried out as a continuous process, so that the municipal wastes of relatively high moisture content, including liquid sewage, may be continuously and uninterruptedly heated to reduce its moisture content progressively to combustibility and to automatic ignition and consumption, and this aspect of my invention includes a further feature of utilizing the heat of combustion of the dried waste to reduce further quantities of the waste and/or liquid sewage to combustible dryness in a continuous and cyclic process.

Yet another object of my invention resides in the provision of a process for the destruction of liquid sewage which includes the process of forming a liquid sewage into a travelling bed of sewage while simultaneously projecting heated gas through the bed throughout its length in such a manner as to progressively reduce the bed to combustible dryness, ignite it and consume it.

These and other objects of my invention will be apparent from a perusal of the following specification when taken in connection with the following drawing wherein is illustrated, rather diagrammatically, one type of apparatus for carrying out my process. In the drawing, Fig. 1 is a side view, rather diagrammatically disclosing one type of apparatus for carrying out my invention, and Fig. 2 is a detailed view of the heat exchanger.

Referring now to the drawing in detail wherein is disclosed a selected form of continuous drier and incinerator for the sanitary and commercial disposition of municipal wastes, including garbage and liquid sewage sludge, it is to be understood that the form illustrated is purely by way of exemplifying the advantages of my broad invention and process and that other constructions and apparatus may be utilized for carrying out my process.

Municipal wastes should be understood as including what is generally known as garbage, consisting of table refuse, vegetable matter of all types, meat scraps, bones, paper scraps, small bits of wood, and frequently street sweepings, stable refuse and all other forms of discarded organic material. The foregoing excludes what is known as the furnace refuse, or ashes, which in most municipalities is separately collected and separately disposed of. Garbage naturally varies in moisture content in various cities and in various parts of cities, depending upon the presence of industries utilizing organic material in their processes. Normally, however, residential garbage will contain about 80% of moisture. Such elements as banana skins, vegetable leaves, vegetables such as beets, potatoes, turnips, etc., will contain as high as 90% or over in moisture, whereas meat scraps, bones, bits of wood, paper and the like have a much lower moisture content. Authorities in the disposition of municipal wastes are agreed, however, that an average moisture content of 80% is an accurate figure for estimating purposes. It must be understood that all of the foregoing is strictly solid material and in no sense a fluid or liquid, although the garbage may contain enough moisture to leak or run out if allowed to stand in a pile sufficiently long to drain.

Sewage is understood to mean the effluent from sanitary sewers and is primarily composed of human wastes together with fibrous materials, small bits of woods, but all in a highly liquid state. Sewage as ordinarily obtained contains 99.5% of water in which case it is just as fluid as water but contained therein is a considerable amount of organic material in the form of gelatinous and albuminous substances which are non-filterable and also a considerable amount of solid materials so finely divided that they will pass through the pores of any practical filtering medium.

It is for the purpose of coagulating or agglomerating these superfine particles and the albuminous material that coagulants such as alum or ferric chloride have heretofore been added to the raw sewage prior to any filtration process. My process, while it includes the dehydration and burning of coagulated and filtered sewage, is primarily concerned with the treatment of raw untreated sewage just as it emerges from the sewer (which may be condensed by simple settling or sedimentation) wherein the raw material is flowed onto the perforate conveyor, subjected to the heated gas treatment as hereinabove stated, however, it is an essential element of my treatment that the albuminous or the gelatinous elements remain in the material during the preliminary de-watering or drying and remain on the belt or conveyor as a thick, viscid mess containing solids in highly concentrated form. In this condition they are extremely adhesive or sticky and cannot be removed from the conveyor surface except by extraordinary and impractical means. By the application of heated gas at suitable temperature as practised in my invention, the albuminous substances are changed or coagulated so that all the solids resulting therefrom, together with the solids in the original liquid are left as a deposit on the conveyor. This process results in high shrinkage in volume of the material so that the resultant cake shrinks in form as compared to the original fluid and thereby becomes non-adhesive and this feature, combined with the severe shrinkage of the material causes its self-detachment from the supporting surface so that when the end of the dryer is reached and the dried material reaches combustion chamber 38, the shrinkage of the material provides voids in the layer on the pervious surface which causes sharp and thin edges to form, thus facilitating ignition and also providing cracks or fissures in the bed or blanket to permit the passage of heated gas therethrough, for the purpose of burning the material.

In the form illustrated, I provide a continuous chain belt 2 passing over the end sprockets 4 and 6 together with means for moving the belt in a continuous manner. If desired, means may be provided for interruptedly moving the belt. The links of the belt carry cross bars which in turn carry spaced-apart longitudinally extending bar-like elements arranged in overlapping relation in the manner described in my co-pending application, Serial No. 578,787, filed December 3, 1931.

As shown in this application, these bar-like elements provide a grate surface, the spaces between the bars being substantially 1/40th of an inch so as to permit heated aeriform fluid to be projected therethrough, while at the same time permitting the bars to pass around the sprockets at the end of the path of travel of the belt. I prefer to have this distance 1/40 of an inch more or less whereby to take advantage of the surface tension of the liquid to maintain itself upon this slotted carrier, without passing through these slots, particularly when no air is being projected upwardly through the slots, it being understood that when air is being projected through the slots the air itself, in addition, acts as a supporting medium for the liquid sewage on the carrier. However, it is to be distinctly understood that my invention is not limited to a carrier having slots of 1/40 of an inch, or less width, to provide the surface tension support above recited, but that the invention is broader in its scope in that it includes slots, foraminations or openings in the carrier of much greater width and through which liquid might ordinarily flow in a quiescent state, but when such wider slots are used, the arrangement will be such that as the liquid sewage is poured onto such a slotted carrier, the velocity alone of the heated gas projected through the slots, irrespective of the surface tension serves to support the liquid on the conveyor. In addition, the surface beneath the upper reach of the belt is constructed to provide a plurality of isolated chambers 8, 10, 12, 14 and 16 by means of spaced partitions 18, 20, 22, 24, 26 and 28, suitable means being provided for maintaining these stationary chamber-forming partitions in sealed contact with the shiftable sludge supporting grate-like surface 30 of the drier in the manner shown in my application recently filed, Serial No. 582,098, filed Dec. 19, 1931.

In accordance with the invention of my present process, the path of travel of the municipal waste supporting surface of the combined drier and burner is divided into two zones—first: a drying zone comprising the chambers 8, 10, 12 and 14, and a burning zone comprising the chamber 16. The chamber forming the burning zone is formed with a lining of heat-insulating material 32. The heating zone chambers above the travel of the carrier are provided with a hood 34 adapted to catch the heated aeriform fluid which is discharged thereinto whereas the drier above the burning zone or chamber 16 is provided with an additional hood 36, lined with heat-insulating material 38 which is adapted to catch the gases of combustion and also the heated aeriform fluid, and convey the same by means of pipe 40 to a blower 42. This blower is connected to a furnace or stoker 44 from which products of combustion will pass as indicated by the arrow 46 into the blower, and along with the hot products from the pipe 40 are passed or forced into the intake conduit 48 and from thence into the heat exchanger 50. The hot products of combustion and gases pass therethrough and out the gas outlet 52, while the air from the air inlet 54 passes in counter-direction and isolated from the hot products of combustion through the heat exchanger. Air is then passed through the discharge pipes 56, 58, 60, 62 and 64 and is projected by means of suitable blowers 66 through pipes 68, 70, 72, 74 and 76 and 78 to chambers 8, 10, 12, 14 in the drying zone, and chamber 16 in the burning zone. It will be noted that each of the pipes from 68 to 74 is provided with separate, adjustably-controlled dampers and air inlets 80, 82, 84 and 86, and means is also provided for controlling the speed of rotation of the blowers whereby not only the temperature of each chamber 8, 10, 12 and 14 may be controlled, but also the volume of the heated air through the porous bed of the traveling drier. In this way the drying effect longitudinally of the travel of the bed may be suitably controlled. For instance, by these adjustments, the temperature of the heated aeriform fluid passing through chamber 8 may be regulated to 1,000 degrees; that of chamber 10 to 900 degrees; that of chamber 12 to 600 degrees and that of chamber 14 to 300 degrees. These temperatures are merely illustratively selected. It is to be understood that any desired range of temperatures and velocities of projection of the heated aeriform fluid may be utilized, depending upon the nature of the garbage, liquid sewage or other material to be treated and consumed. It will be noted that the residues or ashes from the combustion zone are ultimately discharged from the end of the drier into an ash conveyor.

Any desired means is provided for automatically and continuously forming a blanket or layer of garbage and/or liquid sewage on the upper face of the traveling porous or grate-like surface 30. In instances where the municipal waste is liquid sewage, I prefer to provide a float-controlled feed device in the manner described in my application, Serial No. 582,098 aforesaid, whereby to provide an initially liquid blanket or bed of sewage of substantially uniform thickness, preferably from 2 to 6 inches in thickness. This may be accomplished by delivering the sewage through a nozzle 80 discharging into a hopper 82 having a discharge opening in position to co-operate with and deliver the blanket of sludge on the conveyor 30. In other instances where the sewage is of less moisture content, such for instance, as where the sewage is of yeastcake-like consistency, it may be distributed onto the continuously moving drier or carrier in any approved manner. For instance, the yeast-like sludge may be delivered in lumps in a hopper 84 and expelled therefrom, by means of a ram 86, onto the carrier 30. In some instances I prefer to mix the sewage with garbage and/or ash containing a small amount of combustible material or other fuel-containing ingredient, and in other instances I desire to consume garbage alone or sewage alone. In any of these cases the proper feeding instrumentalities may be provided for distributing the municipal wastes upon the traveling drier for its most effective consumption. In some instances I may add coal or coke to sludge when it is in liquid or non-liquid state and properly feed the resulting mixture in bed-like form onto the travelling drier.

In the operation of the apparatus for carrying out my process, the liquid sewage or other municipal waste is preferably, but not necessarily formed in a continuous manner as a relatively thin blanket or bed upon the upper surface of the traveling drier. It then passes along over the drying chambers 8, 10, 12 and 14, from which the heated aeriform fluid, in the present illustration, heated air, is projected with sufficient force so that the material of the bed immediately above the heating chamber 8 is caused violently to bubble or boil by means of the aeriform fluid being projected therethrough. As the quickly drying material of the bed passes along it is gradually reduced to combustible dryness and by the time it reaches the burning zone it will be combustibly dry. In order to prevent the premature drying of the bed, I gradually reduce the temperature of the heated air passed through the bed and to this end, prefer to cut down the temperature of the gases considerably in the chambers 10, 12 and 14 in general to correspond with the reduction in moisture content of the bed. By introducing considerable quantities of relatively cool air, particularly into chamber 14, premature burning and charring of the sewage, garbage or municipal waste may be prevented. As the bed passes over the burning zone and under the hood 36, the highly heated air, preferably undiluted with cool air, is forced through the dry sludge thereby instantly and automatically causing it to burn and to be consumed. The resulting ash may be discharged over the end of the continuous conveyor into a receiver 88, preferably in the form of an ash conveyor adapted to remove the ash to a remote disposal point. The products of combustion including the heated air projected through the bed are then extracted through pipe 40 by means of blower 42 and are passed along with the products of combustion from the furnace or stoker into the heat exchanger. In those cases wherein I dry sewage, it is necessary to provide a stoker or furnace 44 for the purpose of securing additional heat of combustion for carrying out the drying and burning of the sewage. However, in certain instances, when additional fuel material or any material containing sufficient heat units is added to the sewage to be consumed in my drying process, I may continue the process of drying and burning the same merely by utilizing the products of combustion of the sewage, which has previously been admixed with the additional fuel-containing ingredient, or the fuel itself. In this case it is necessary to start the operation or process first by means of the furnace 44 to provide sufficient heat of combustion to dry the moisture-containing materials and then as soon as these become dry and are burned, sufficient heat of combustion will be furnished in the burning zone whereby to carry on the continuous drying operation in an endless cycle. This type of process contemplates the addition of sufficient fuel to the sewage by feeding it into the feed hopper or other feeding instrumentality at the front end of the traveling drier. In instances where the drying, burning and destruction of garbage is the purpose to be accomplished, it is generally found that the garbage itself will contain a sufficient number of heat units to effect its own drying without the addition of other fuel.

In certain instances, instead of providing a furnace for starting the drying operation, the starting may be accomplished by loading that portion of the drier within the combustion chamber 36 with a readily combustible fuel instead of using the furnace 44 as hereinbefore described.

It will be understood that my invention is not confined to a drying operation where the air is utilized as a heated aeriform fluid because the products of combustion in the burning zone may be directly utilized by running the same through a separator for removing ash or other foreign matter, and then these products may be directly projected not only through the drying chambers 8, 10, 12 and 14, suitably diluted with air if desired, but the products may also be projected through the chamber 16 into the burning zone to carry out the burning and consumption of future quantities of municipal waste. In this last instance these products of combustion can be augmented by the products of combustion from the furnace 44 or any gases; where the material to be consumed is admixed with sufficient fuel or other combustible, heat-contributing material I may start the process with the furnace, and then carry on the process by the products of combustion generated in the burning zone alone.

It will, of course, be appreciated that in connection with the utilization and adaptability of my process to the destruction of liquid sewage, I may, particularly in treating liquid sewage, partly de-water the same in any desired manner either by evaporation, centrifuging, suction filtration, or otherwise, prior to feeding it onto the traveling drier.

Having thus fully described my invention, what I claim as new and desire to obtain by Letters Patent is:

1. The process of destroying municipal waste including drying the waste by subjecting it to heated gases at progressively decreasing temperatures as the waste dries and by thereafter burning the dried waste by subjecting it to heated gases at a sufficient temperature to promote ignition.

2. The herein described process of destroying liquid sewage comprising continuously forming the liquid sewage into a bed, causing the bed to travel while projecting heated gases through the travelling bed, the temperatures of the gases so projected decreasing from the initial point of projection in the direction of the travel of the bed, from substantially 1000 degrees Fahrenheit more or less down to substantially 300 degrees Fahrenheit more or less whereby to reduce the bed to combustible dryness without burning or charring the same, and projecting heated gases through the bed at a point beyond the zone where said bed has thus been reduced to combustible dryness, the temperature of the gases projected through said latter zone being substantially 1000 degrees more or less to promote the ignition and destruction of the bed.

3. The herein described process of destroying liquid sewage comprising continuously forming the liquid sewage into a bed, causing the bed to travel while projecting heated gases through the travelling bed, the temperatures of the gases so projected decreasing from the initial point of projection in the direction of the travel of the bed, from substantially 1000 degrees Fahrenheit more or less down to substantially 300 degrees Fahrenheit more or less whereby to reduce the bed to combustible dryness without burning or charring the same, and projecting heated gases at temperatures, sufficient to promote the ignition and burning of the dried waste, through the bed at a point beyond the zone where said bed has thus been reduced to combustible dryness.

4. The herein described process of destroying liquid sewage comprising continuously forming the liquid sewage into a bed, causing the bed to travel while projecting heated gases through the travelling bed, the temperatures of the gases so projected decreasing from the initial point of projection in the direction of the travel of the bed, from substantially 1000 degrees Fahrenheit more or less down to substantially 300 degrees Fahrenheit more or less whereby to reduce the bed to combustible dryness without burning or charring the same, and then raising the temperature of the bed to 1000 degrees Fahrenheit, more or less, whereby to promote ignition and combustion of the dried waste by burning.

5. The process of destroying municipal waste, which consists in drying the waste by subjecting it successively, as the waste dries, to the drying action of heated gases of progressively decreasing temperature, and, after the waste reaches a condition of combustible dryness, by raising the temperature of the dried waste above its point of ignition to promote the burning of the same.

6. The process of destroying municipal waste, which consists in evaporating the moisture content of the waste by maintaining the same at progressively decreasing temperatures as the waste dries, and, after the waste reaches combustible dryness, raising the temperature above the ignition point of the dried waste in order to promote the combustion of the same.

JOSEPH HARRINGTON.